United States Patent [19]

Götz

[11] Patent Number: 5,423,616
[45] Date of Patent: Jun. 13, 1995

[54] SUPPORTING DISK FOR A SUPPORTING DISK BEARING ARRANGEMENT FOR OPEN-END SPINNING ROTORS

[75] Inventor: Dieter Götz, Geislingen/Steige, Germany

[73] Assignee: Spindelfabrik Suessen, Schurr, Stahlecker & Grill GmbH, Germany

[21] Appl. No.: 74,473

[22] Filed: Jun. 11, 1993

[30] Foreign Application Priority Data

Aug. 20, 1992 [DE] Germany .................. 42 27 489.3

[51] Int. Cl.⁶ .............................................. F16C 19/00
[52] U.S. Cl. ..................................... 384/549; 57/406; 57/407
[58] Field of Search ................... 384/549, 295, 548; 57/406, 407

[56] References Cited

U.S. PATENT DOCUMENTS 4,892,422  1/1990  Stahlecker ................. 384/549
4,893,946  1/1990  Tesh et al. .
4,916,891  4/1990  Landwehrkamp et al. ......... 57/406

Primary Examiner—Lenard A. Footland
Attorney, Agent, or Firm—Evenson, McKeown, Edwards & Lenahan

[57] ABSTRACT

A supporting disk for a supporting disk bearing arrangement for open-end spinning rotors is provided with a disk-shaped basic body as well as an outer ring anchored to it. The circumference of the outer ring is constructed as a running surface for a shaft of an open-end spinning rotor. The outer ring and the basic body are made of plastic material. The outer circumference of the basic body and the inner circumference of the ring are provided with a surrounding undercut-type profiling respectively which engage in a form-locking manner and which are designed as a projection on the ring and as a recess on the basic body. The non-cut profiling is achieved by manufacturing the outer ring in a first tool and subsequently placing the ring in a second tool. The basic body is injection-molded to the outer ring on this second tool.

14 Claims, 4 Drawing Sheets

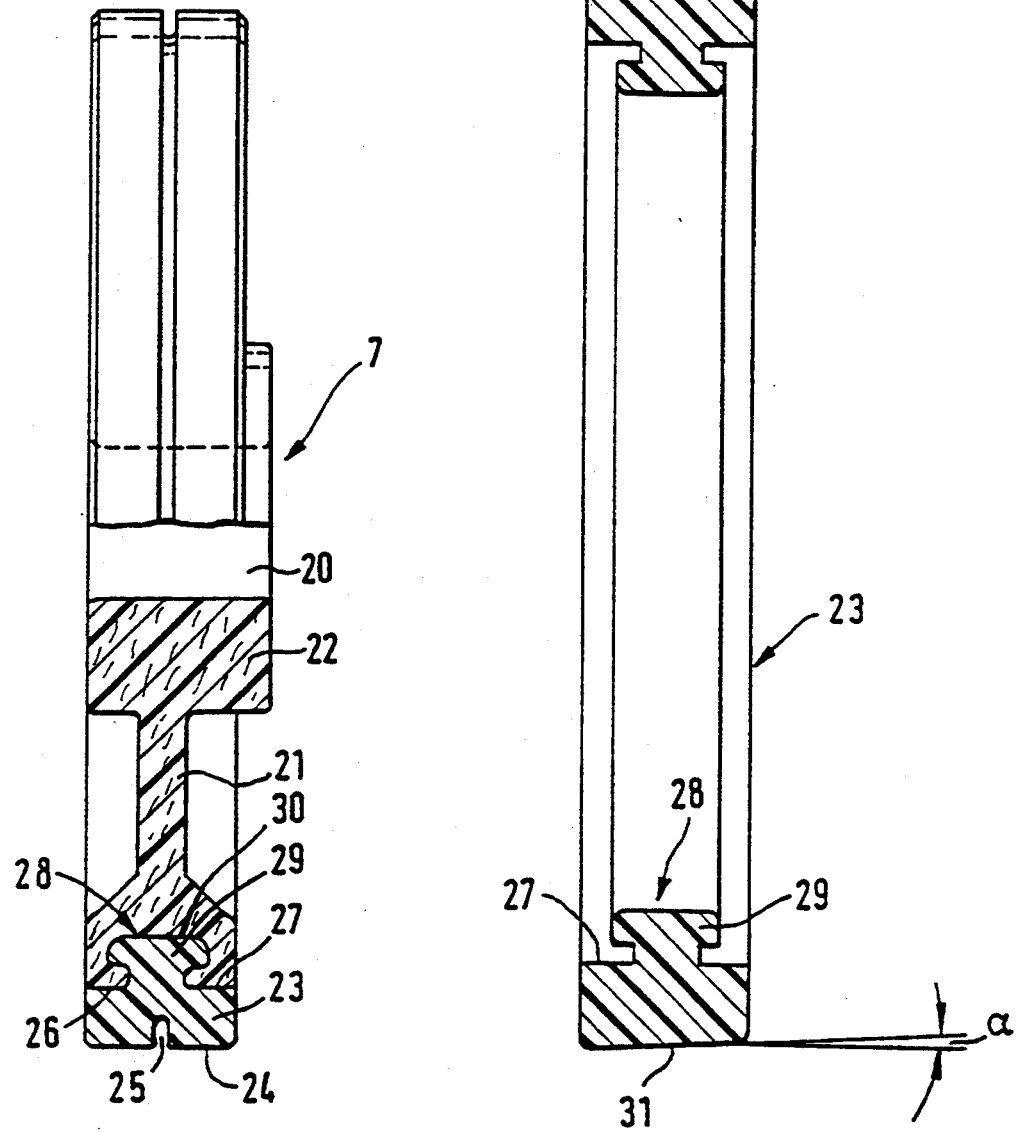

SUPPORTING DISK FOR A SUPPORTING DISK BEARING ARRANGEMENT FOR OPEN-END SPINNING ROTORS

BACKGROUND AND SUMMARY OF THE INVENTION

The present invention relates to a supporting disk for a supporting disk bearing arrangement for open-end spinning rotors which comprises a disk-shaped basic body made of plastic and an outer ring which is anchored to it, is also made of plastic, and whose circumference is constructed as a running surface for a shaft of an open-end spinning rotor, the outer circumference of the basic body and the inner circumference of the ring being provided with a surrounding undercut-type profiling respectively which engage in one another in a form-locking manner, and are developed as a projection on the ring and as a recess on the basic body. The invention also relates to a process for the manufacturing of such a supporting disk.

U.S. Pat. No. 4,893,946 shows the working into the circumference of a basic body a dovetailed groove in which the subsequently injection-molded-on plastic ring is anchored. The basic body is preferably made of aluminum but, according to Column 7, Lines 13–18 of U.S. Pat. No. 4,893,946, may also be made of plastic. Since the basic body is manufactured before the ring, the undercut situated in the basic body must be machined in a cutting manner. This not only represents additional manufacturing expenditures but also reduces the stability of the basic body at the critical point.

An object of the invention is to produce a supporting disk of the initially mentioned type in a low-cost manner and to anchor the ring securely on the basic body.

This and other objects are achieved in that the profiling is a non-cut profiling produced in a non-cutting manner.

This can be accomplished according to the present invention in that, contrary to the previous custom, the ring is not injection-molded to the basic body, but rather the basic body is injection-molded onto the ring. First, the ring is manufactured in a first tool as a component part; is taken out of this tool; and is then placed in a second tool in which the basic body (also made of plastic) is manufactured and is injection-molded onto the ring in the process. By such a process, it becomes possible to provide the profilings on the basic body and on the ring respectively in a non-cutting manner.

According to the present invention, it is therefore possible, despite the non-cutting manufacture, to also implement an undercut-type profiling if the profiling is not made on the ring but on the basic body as a recess. This results in the advantage that the whole thickness of the ring having the running surface is available for a damping of the open-end spinning rotor during the operation. The ring is therefore not weakened by recesses used for the anchoring.

Although they have been described in the literature, supporting disks whose basic body is made of plastic so far have not been used in series-produced machines. However, in contrast to basic bodies made of metal, basic bodies made of plastic have the advantage that the connection between the basic body and the ring becomes more intimate at the anchoring point because, in the case of a subsequent injection molding of the basic body to the ring, the surface of the ring is also heated at the contact point and is therefore softened.

Expediently, the profiling will be constructed to be approximately T-shaped in the axial sectional view, in which case the depth of the profiling may correspond approximately to the thickness of the ring. Furthermore, it is expedient for the interior circumference of the ring to have (in the axial sectional view) the same width as the outer circumference of the basic body. In this case, the width of the ring (in the axial sectional view) may correspond to approximately twice the thickness of the ring.

In an advantageous development of the invention, a narrow circumferential groove is worked into the ground running surface of the ring. Such circumferential grooves are used for the cooling of the running surface and have been successful in practice.

In certain embodiments of the invention, the basic body and the ring are made of different plastic materials. It is useful, for example, to manufacture the ring for reasons of damping from a more elastic plastic material than the basic body. While the ring should therefore be elastic but wear-resistant, the basic body is expediently made of a harder and firmer, preferably fiber-reinforced plastic material.

Other objects, advantages and novel features of the present invention will become apparent from the following detailed description of the invention when considered in conjunction with the accompanying drawings.

BRIEF DESCRIPTION OF THE DRAWINGS

FIG. 3 is an axial sectional view and an enlarged view of an individual supporting disk in accordance with the present invention.

FIG. 4 is an axial sectional view of the first produced ring illustrated as a semifinished product.

DETAILED DESCRIPTION OF THE DRAWINGS

Figure 1:
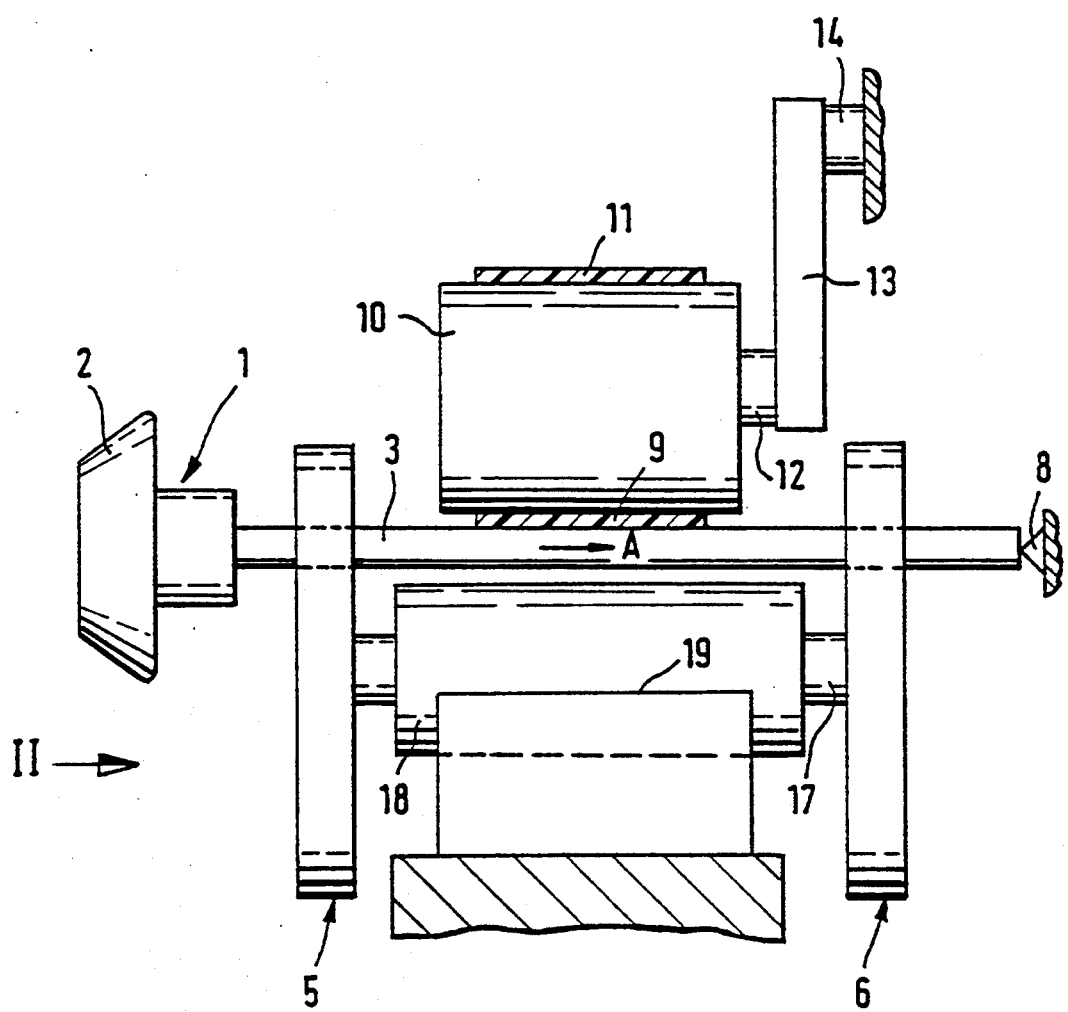
FIG. 1 is a partially cut lateral view of a supporting disk bearing arrangement constructed in accordance with an embodiment of the present invention for an open-end spinning rotor.
Figure 2:
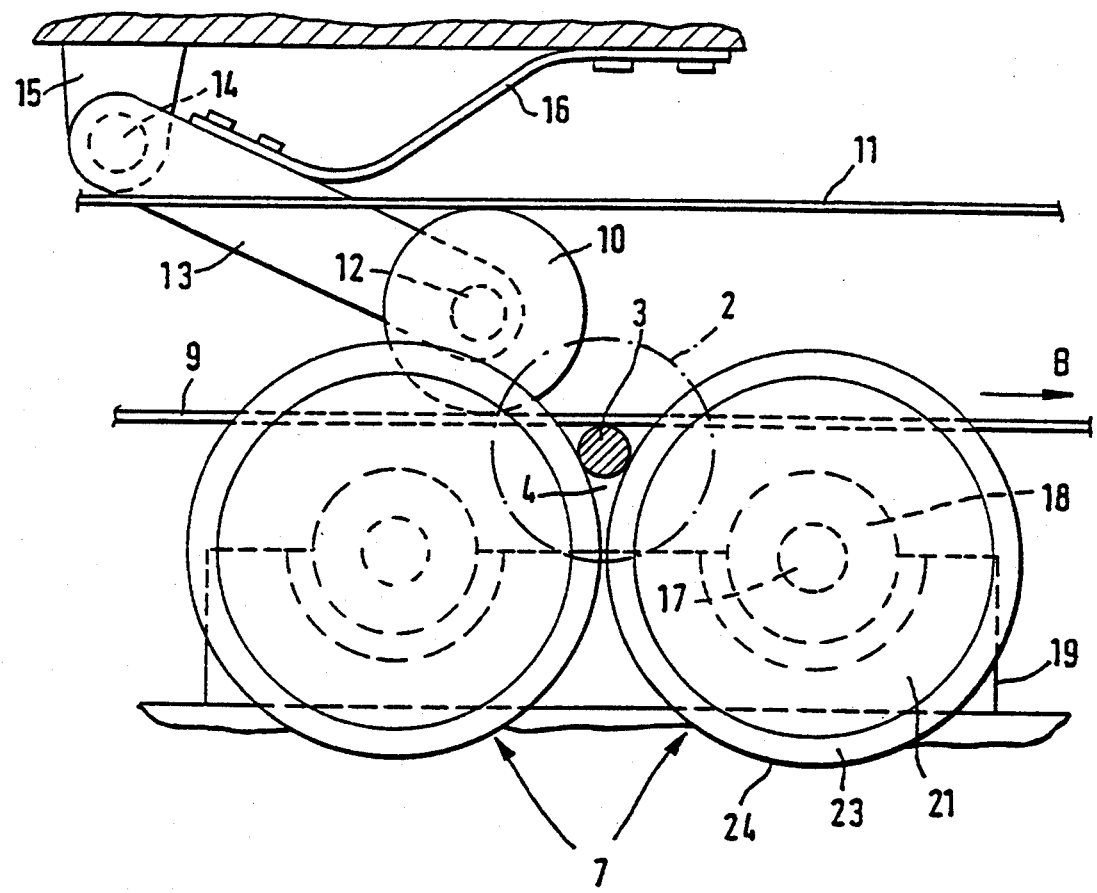
FIG. 2 is a view in the direction of the arrow II of FIG. 1.

The open-end spinning rotor 1 illustrated in FIGS. 1 and 2 comprises a rotor 2 which is non-rotatably arranged on a shaft 3. The shaft 3 is disposed in wedge-shaped gaps 4 which are formed by two supporting disk pairs 5 and 6. Each supporting disk pair 5, 6 comprises two supporting disks 7 which are arranged at a narrow distance next to one another and which each form a wedge-shaped gap 4.

On the end situated opposite the rotor plate 2, the shaft 3 is supported by means of a step bearing 8 against which the shaft 3 is pressed under the effect of an axial thrust A during the operation.

The shaft 3 is driven by a tangential belt 9 which travels through the spinning machine in the direction of the arrow B and in the process drives a plurality of shafts 3. The tangential belt 9 is loaded by a contact pressure roller 10 in the proximity of the shaft 3. The returning run 11 of the tangential belt 9 is guided back on the contact pressure roller 10.

The contact pressure roller 10 is disposed to be freely rotatable about a shaft 12 that is essentially in parallel to the shaft 3. Shaft 12 is arranged on a swivel arm 13 which, being swivellable about a shaft 14 parallel to shaft 12, is held on a holder 15 fastened to the machine frame. By means of a loading spring 16 constructed as a leaf spring, the swivel arm 13 is loaded in the direction of the shaft 3.

The shafts 17 of two supporting disks 7 which are each situated on one side of the shaft 3 are, in each case, disposed in a bearing housing 18 which, in turn, is disposed in a bearing block 19 and is secured by tension elements which are not shown. The shafts 17 are placed slightly skewed with respect to one another about an axis extending in parallel to the tangential belt 9. Because of this skewed positioning in connection with the travelling direction B of the tangential belt 9, the mentioned axial thrust A against the step bearing 8 is generated.

In the illustrated operating position, the tangential belt 9 in connection with the contact pressure roller 10 holds the shaft 3 in the wedge-shaped gaps 4. When the open-end spinning rotor 1 is braked, the tangential belt 9 is lifted off or at least loosened with respect to the shaft 9 in a manner that is not shown, in which case, at the same time, a brake is applied to the shaft 3 which will then take over the securing of the position of the shaft 3 and thus of the open-end spinning rotor 1.

The four supporting disks 7, of which one is illustrated in FIG. 3 at an enlarged scale, have essentially identical constructions. The supporting disks 7 have a disk-shaped basic body 21 which is made of plastic and which is non-rotatably mounted on the shaft 17 by means of a hub 22 having an axial bore 20. The basic body 21 is anchored to an outer ring 23 which is also made of plastic and the circumference of which is constructed as a running surface 24. A narrow circumferential groove 25 is worked into the running surface 24 of the ring 23 which in a known manner has the function of a cooling groove.

In the embodiment of FIG. 3, the ring 23 is made of a plastic material which, although it is resistant to wear, is elastic for achieving a good damping. The basic body 21, however, is made of a different plastic material which is harder and firmer and is preferably fiber-reinforced.

The outer circumference 26 of the basic body 21 and the inner circumference 27 of the ring 23 is provided with a surrounding undercut-type profiling 28 respectively which engage in one another in a form-locking manner. As illustrated particularly in FIG. 4, this profiling 28 is designed as a projection 29 on the ring 23 and as a corresponding recess 30 on the basic body 21. In a manner that will be described in the following, this profiling 28 is produced in a non-cutting manner according to the present invention.

In cases where, up to now, with respect to supporting disks 7, profilings 28 were provided which serve as anchoring between the basic body 21 and the ring 23 and which were constructed to be form-locking and of an undercut type, it was previously necessary to provide the projection on the basic body 21 and thus the recess on the ring 23, which resulted in a weakening of the ring 23. Alternatively, the undercut recess 30 was machined, if it was provided on the basic body 21, in a cutting manner which required increased manufacturing expenditures and which led to a reduced stability in the area of the profiling 28. However, so that the ring is not weakened in its thickness, which requires that the projection 29 be provided on the ring 23, the whole profiling 28 is produced in a non-cutting manner according to the present invention. A profiling produced in a non-cutting manner is hereby defined as a "non-cut profiling".

When in order not to weaken the ring 23 in its thickness the recess 30 is provided on the basic body 21, the undercut-type profiling 28 cannot be produced in a non-cutting manner if the basic body 21 is manufactured first and the ring 23 is injection-molded onto it in the conventional manner. Therefore, for the non-cutting manufacturing of the profiling 28, it is provided according to the invention that, according to FIG. 4, the ring 23 is first injection-molded as a component part in a first tool. The later running surface 24 is not yet developed as such because FIG. 4 shows only a semi-finished product of the ring 23 which is provided with a slightly conical outer surface 31 (see angle $\alpha$) for removal from the first tool. With this approach, it is possible to provide an undercut-type profiling 28 as a projection 29 on the ring 23 in a non-cutting manner.

Figure 5:
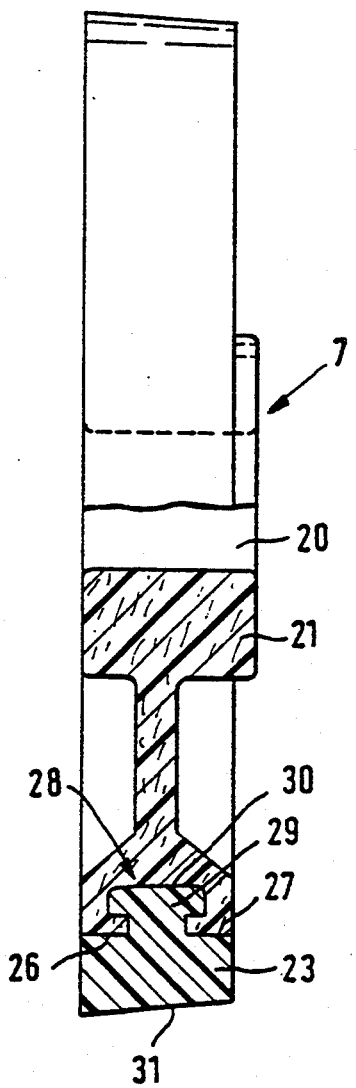
FIG. 5 is a view of the basic body that is injection-molded onto the ring illustrated still as a semifinished product.

The ring 23 according to FIG. 4, which is still in the form of a semifinished product, is taken out of the first tool and, without being aftertreated, is placed in a second tool, in which the basic body 21 is injection-molded (FIG. 5). In this case, the recess 30 of the basic body 21 is injection-molded around the projection 29 of the ring 23 for the forming of the undercut-type profiling 28. A cutting machining in the area of the profiling 28 is therefore not required.

Since the basic body 21 as well as the ring 23 each consists of a plastic material (although the plastic material differs), when the basic body 21 is injection-molded onto the ring 23, the inner circumference 27 of the ring 23 is heated again so that an intimate connection of the two plastic materials is created in the area of the profiling 28. This condition is shown in FIG. 5, in which the still unfinished slightly conical outer surface 31 of the ring 23 can be recognized.

The actual running surface 24 of the ring 23 will be ground only subsequently, in which case the circumferential groove 25 serving as the cooling groove is also recessed.

Figure 6:
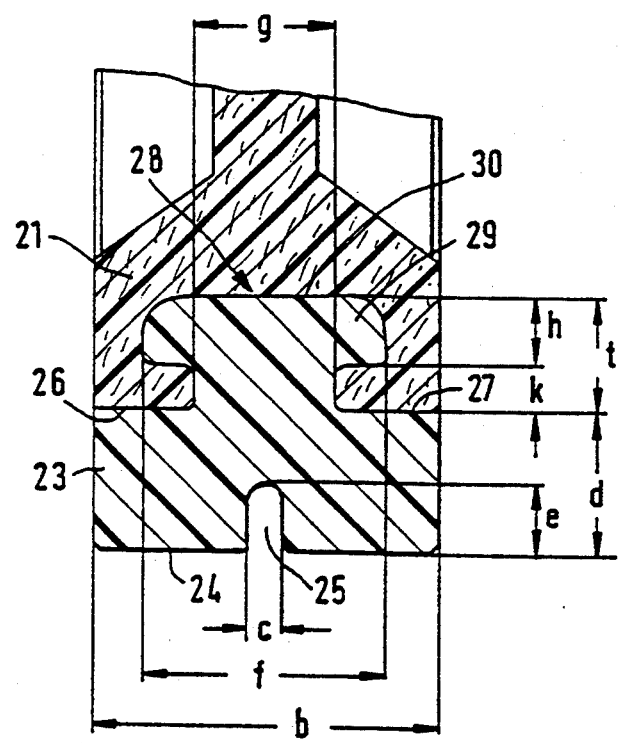
FIG. 6 is a further enlarged partial sectional view of FIG. 3.

The area of the profiling 28 is enlarged still further in FIG. 6. In the illustrated embodiment, the profiling 28 (in an axial sectional view) is constructed approximately in the shape of a T. The depth t of the profiling 28 corresponds approximately to the thickness d of the ring 23. In the case of a thickness d of 4 mm, for example, a depth t of approximately 3.5 mm is selected.

As also illustrated in FIG. 6, the inner circumference 27 of the ring 23 has (in axial sectional view) approximately the same width b as the outer circumference 26 of the basic body 21. This width b corresponds at the same time to the width of the running surface 24, minus the width c of the circumferential groove 25. In the case of a thickness d of the ring 23 of, for example, 4 mm, a width c of 1 mm and a depth e of 2 mm are advantageously selected for the circumferential groove 25. As demonstrated, because of the development of the profiling 28 according to the invention, the ring 23 is virtually not weakened despite the circumferential groove 25. Furthermore, because of the rounding of the contours of the profiling 28 which is provided on all sides in certain embodiments, the anchoring to the ring 23 is particularly intimate after the injection molding of the basic body 21 onto the ring 23.

FIG. 6 also illustrates that the width b of the ring 23 (also in an axial sectional view) corresponds to approximately twice the thickness d of the ring 23. In the case of the above-mentioned dimensions, a width b of approximately 10 mm is selected so that, after the circumferential groove 25 is subtracted, an effective width of approximately 9 mm remains for the running surface 24.

For the profiling 28 that is manufactured in a non-cutting manner, the following exemplary additional dimensions are expedient:

The largest width f of the projection 29, or of the recess 30, is selected to be approximately 7 mm. The smallest width g of the projection 29, or of the recess 30, is 4 mm. This results in an undercut-type effective width of 3 mm. In this case, it is expediently provided that the thickness h of the widest area of the projection 29 is dimensioned to be approximately 2 mm so that a height k of the smallest width of the projection 29 of approximately 1.4 mm will remain.

Although various dimensions have been given in the above description, these dimensions are exemplary only and other dimensions can be used without departing from the scope of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A supporting disk for a supporting disk bearing arrangement for open-end spinning rotors, comprising:
    an injection-molded disk-shaped basic body made of plastic having an outer peripheral surface provided with an undercut annular groove;
    an outer ring made of plastic having an outer peripheral surface for supporting a shaft of an open-end spinning rotor and an inner peripheral surface provided with an annular projection form-lockingly engaging with the annular groove of the basic body;
    wherein the basic body is injection-molded onto the inner peripheral surface of the outer ring to form the annular groove and to engage with the annular projection of the inner peripheral surface of the outer ring; and
    wherein the basic body and the ring are made of different plastic materials.

2. A supporting disk according to claim 1, wherein the profiling is T-shaped in an axial sectional view.

3. A supporting disk according to claim 2, wherein a depth of the profiling corresponds to a thickness of the ring.

4. A supporting disk according to claim 3, wherein the inner circumference of the ring, in an axial sectional view, has the same width as the outer circumference of the basic body.

5. A supporting disk according to claim 4, wherein a width of the ring, in an axial sectional view, corresponds to twice the thickness of the ring.

6. A supporting disk according to claim 5, further comprising a narrow circumferential groove machined into the running surface of the ring.

7. A supporting disk according to claim 2, further comprising a narrow circumferential groove machined into the running surface of the ring.

8. A supporting disk according to claim 2, wherein a width of the ring, in an axial sectional view, corresponds to twice the thickness of the ring.

9. A supporting disk according to claim 2, wherein the inner circumference of the ring, in an axial sectional view, has the same width as the outer circumference of the basic body.

10. A supporting disk according to claim 1, wherein a depth of the profiling corresponds to a thickness of the ring.

11. A supporting disk according to claim 1, wherein the inner circumference of the ring, in an axial sectional view, has the same width as the outer circumference of the basic body.

12. A supporting disk according to claim 1, wherein a width of the ring, in an axial sectional view, corresponds to twice the thickness of the ring.

13. A supporting disk according to claim 1, further comprising a narrow circumferential groove machined into the running surface of the ring.

14. A supporting disk according to claim 1, wherein the ring is made of a more elastic plastic material than the basic body.

* * * * *